United States Patent
Arai et al.

[19]

[11] Patent Number: 6,133,927
[45] Date of Patent: Oct. 17, 2000

[54] IMAGE FORMING APPARATUS

[75] Inventors: Kazuhiko Arai; Kiyotaka Ishikawa, both of Nakai-machi, Japan

[73] Assignee: Fuji Xerox Co., Ltd., Tokyo, Japan

[21] Appl. No.: 09/216,741

[22] Filed: Dec. 21, 1998

[30] Foreign Application Priority Data

Jan. 7, 1998 [JP] Japan .................................. 10-001588

[51] Int. Cl.⁷ ........................... B41J 2/385; G03G 13/04; G03G 15/16; G03G 15/20; H04N 1/52

[52] U.S. Cl. .......................... 347/131; 358/298; 358/454; 399/302; 399/307; 399/308

[58] Field of Search .................... 347/131, 251; 358/456, 298, 454; 399/307, 302, 308, 181

[56] References Cited

U.S. PATENT DOCUMENTS

| | | |
|---|---|---|
| 2,990,278 | 6/1961 | Carlson . |
| 4,903,123 | 2/1990 | Kawamura et al. ................. 358/456 X |
| 5,715,073 | 2/1998 | Miller ................................. 358/298 X |
| 5,854,882 | 12/1998 | Wang ................................ 358/456 X |
| 6,016,417 | 1/2000 | Katsuno et al. ........................ 399/308 |

FOREIGN PATENT DOCUMENTS

| | | |
|---|---|---|
| 46-41679 | 12/1971 | Japan . |
| 2-108072 | 4/1990 | Japan . |
| 5-19642 | 1/1993 | Japan . |
| 5-249798 | 9/1993 | Japan . |
| 10-186892 | 7/1998 | Japan . |

Primary Examiner—Susan S. Y. Lee
Attorney, Agent, or Firm—Oliff & Berridge, PLC

[57] ABSTRACT

In an image forming apparatus which represents gradation of an image by using a halftone screen structure, and which transfers and fixes the image onto a print sheet by using an intermediate transfer body, where a number of protruding portions are provided with an approximately uniform distribution, the degradation of image quality due to a moire fringe pattern produced by the halftone screen structure and the distribution of the protruding portions of the intermediate transfer body is reduced. At least one of the distribution of the protruding portions and the structure of the halftone representation screen is controlled such that the pitch of a moire fringe pattern produced by the protruding portions 51 and a toner image in the highest lightness color is not longer than the pitches of moire fringe patterns produced by the protruding portions and toner images in other colors, or the pitch of a moire fringe pattern produced by the protruding portions and a toner image in the lowest lightness color is not shorter than the pitches of moire fringe patterns produced by the protruding portions and toner images in other colors, or the pitch of moire fringe patterns is 0.5 mm or shorter.

16 Claims, 11 Drawing Sheets

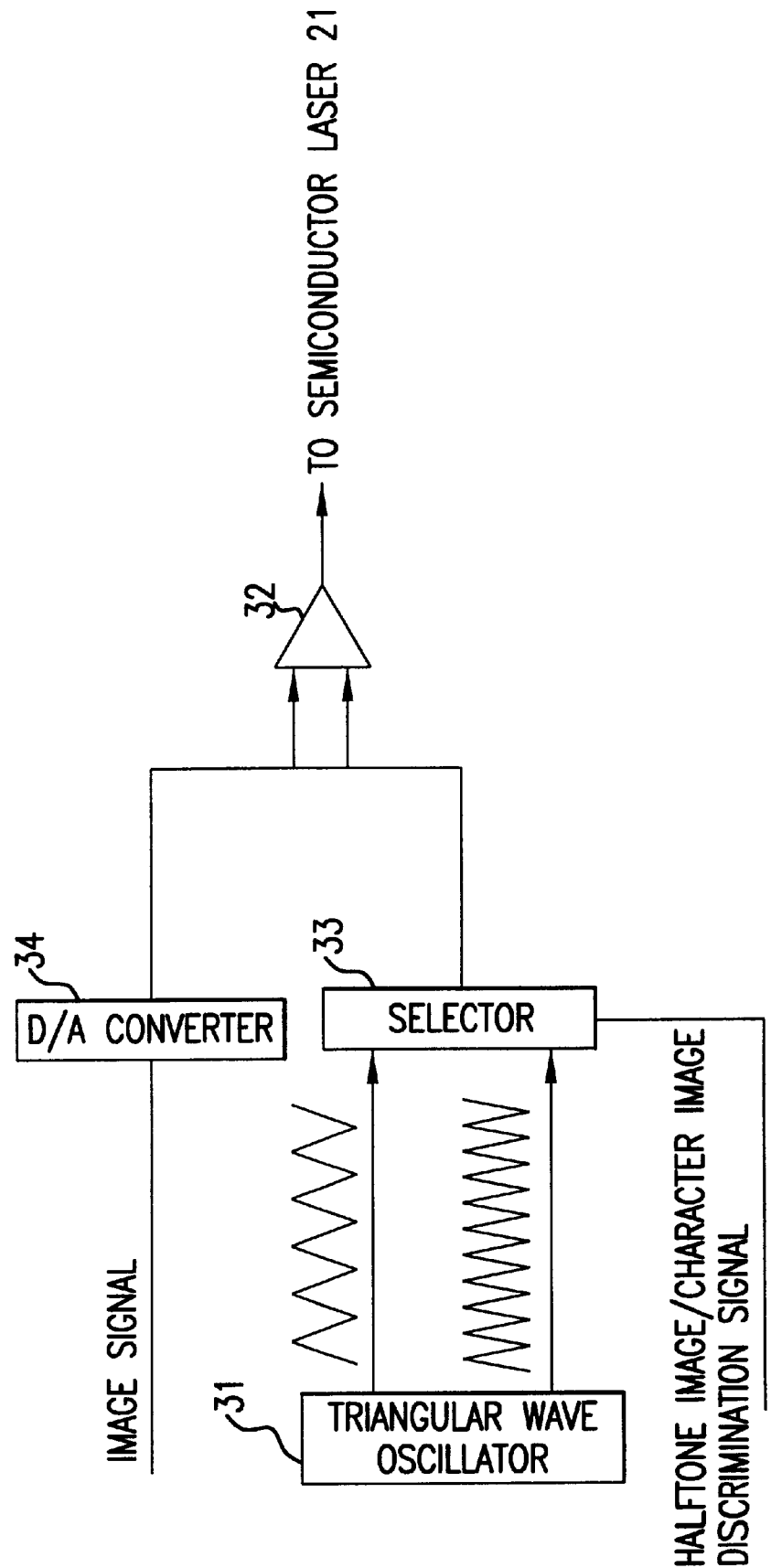

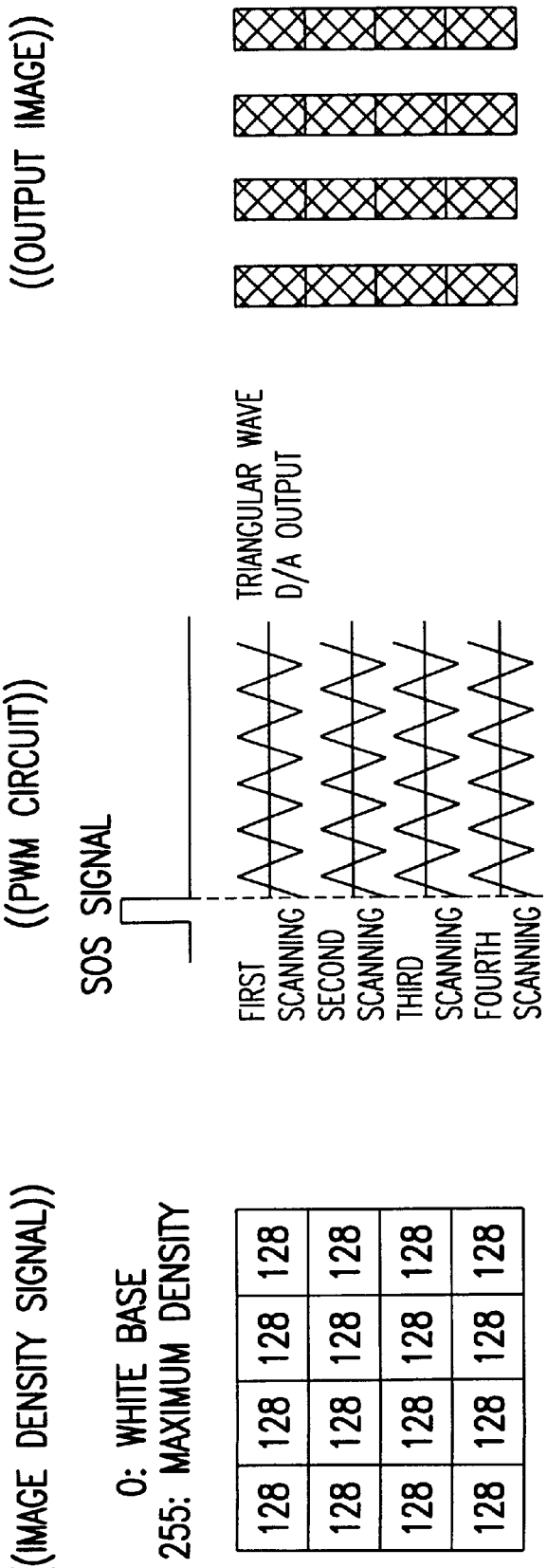

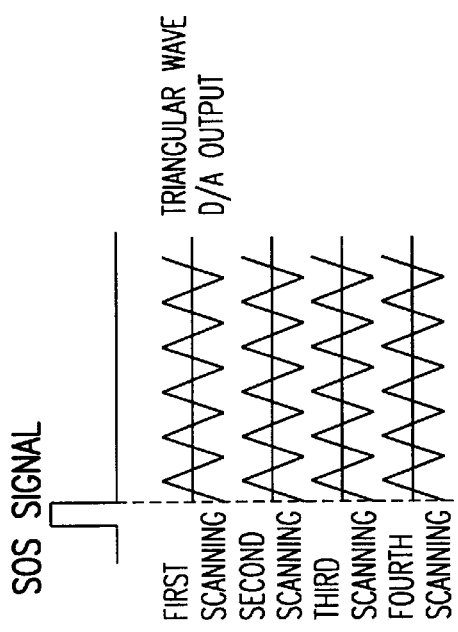
FIG.5a ((IMAGE DENSITY SIGNAL))
FIG.5b ((PWM CIRCUIT))
FIG.5c ((OUTPUT IMAGE))

((IMAGE DENSITY SIGNAL))

0: WHITE BASE
225: MAXIMUM DENISTY

| 128 | 128 | 128 | 128 | 128 | 128 | 128 | 128 |
|---|---|---|---|---|---|---|---|
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |

((DOT-PATTERN FORMATION FILTER))

| 159 | 175 | 191 | 207 | 159 | 175 | 191 | 207 |
|---|---|---|---|---|---|---|---|
| 143 | 31 | 47 | 223 | 143 | 31 | 47 | 223 |
| 127 | 15 | 63 | 239 | 127 | 15 | 63 | 239 |
| 111 | 95 | 79 | 255 | 111 | 95 | 79 | 255 |
| 159 | 175 | 191 | 207 | 159 | 175 | 191 | 207 |
| 143 | 31 | 47 | 223 | 143 | 31 | 47 | 223 |
| 127 | 15 | 63 | 239 | 127 | 15 | 63 | 239 |
| 111 | 95 | 79 | 255 | 111 | 95 | 79 | 255 |

((DOT-PATTERN FORMATION RESULT))

| 0 | 0 | 0 | 0 | 0 | 0 | 0 | 0 |
|---|---|---|---|---|---|---|---|
| 0 | 255 | 255 | 0 | 0 | 255 | 255 | 0 |
| 255 | 255 | 255 | 0 | 255 | 255 | 255 | 0 |
| 255 | 255 | 255 | 0 | 255 | 255 | 255 | 0 |
| 0 | 0 | 0 | 0 | 0 | 0 | 0 | 0 |
| 0 | 255 | 255 | 0 | 0 | 255 | 255 | 0 |
| 255 | 255 | 255 | 0 | 255 | 255 | 255 | 0 |
| 255 | 255 | 255 | 0 | 255 | 255 | 255 | 0 |

((OUTPUT IMAGE))

((IMAGE DENSITY SIGNAL))

0: WHITE BASE
225: MAXIMUM DENISTY

| 64 | 64 | 64 | 64 | 64 | 64 | 64 | 64 |
|----|----|----|----|----|----|----|----|
| 64 | 64 | 64 | 64 | 64 | 64 | 64 | 64 |
| 64 | 64 | 64 | 64 | 64 | 64 | 64 | 64 |
| 64 | 64 | 64 | 64 | 64 | 64 | 64 | 64 |
| 64 | 64 | 64 | 64 | 64 | 64 | 64 | 64 |
| 64 | 64 | 64 | 64 | 64 | 64 | 64 | 64 |
| 64 | 64 | 64 | 64 | 64 | 64 | 64 | 64 |
| 64 | 64 | 64 | 64 | 64 | 64 | 64 | 64 |

((DOT-PATTERN FORMATION FILTER))

| 191 | 175 | 223 | 255 | 95  | 15  | 31  | 143 |
|-----|-----|-----|-----|-----|-----|-----|-----|
| 63  | 47  | 159 | 239 | 207 | 111 | 127 | 79  |
| 15  | 31  | 143 | 191 | 175 | 223 | 255 | 95  |
| 111 | 127 | 79  | 63  | 47  | 159 | 239 | 207 |
| 223 | 255 | 95  | 15  | 31  | 143 | 191 | 175 |
| 159 | 239 | 207 | 111 | 127 | 79  | 63  | 47  |
| 143 | 191 | 175 | 223 | 255 | 95  | 15  | 31  |
| 79  | 63  | 47  | 159 | 239 | 207 | 111 | 127 |

((DOT-PATTERN FORMATION RESULT))

| 0   | 0   | 0   | 0 | 0   | 255 | 255 | 0   |
|-----|-----|-----|---|-----|-----|-----|-----|
| 255 | 255 | 0   | 0 | 0   | 0   | 0   | 0   |
| 255 | 255 | 0   | 0 | 0   | 0   | 0   | 0   |
| 0   | 0   | 0   | 255 | 255 | 0 | 0   | 0   |
| 0   | 0   | 0   | 255 | 255 | 0 | 0   | 0   |
| 0   | 0   | 0   | 0 | 0   | 0   | 255 | 255 |
| 0   | 0   | 0   | 0 | 0   | 0   | 255 | 255 |
| 0   | 255 | 255 | 0 | 0   | 0   | 0   | 0   |

((OUTPUT IMAGE))

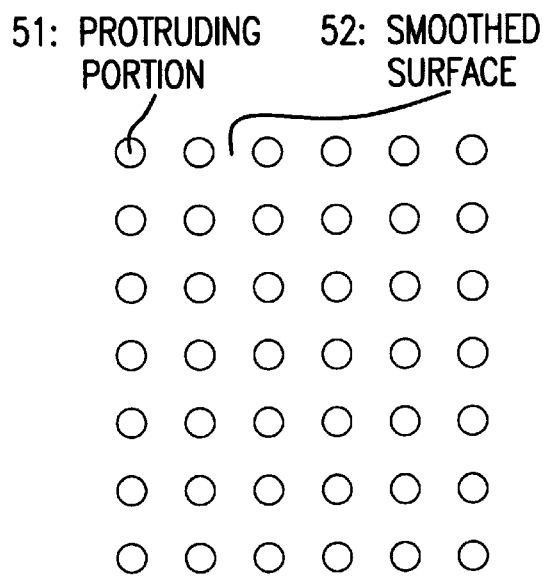
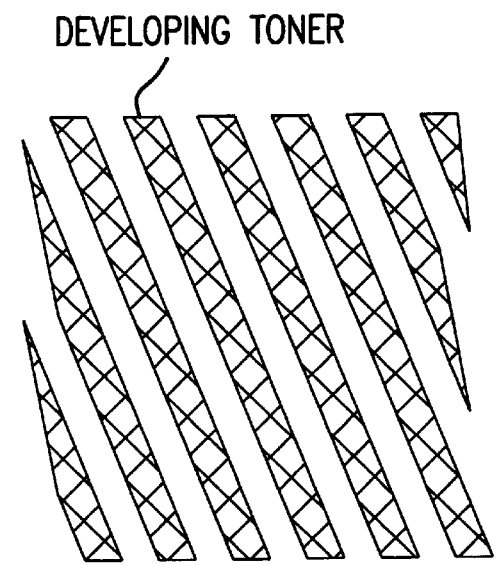
FIG.11a
INTERMEDIATE TRANSFER BODY
FIG.11b
DEVELOPED TONER IMAGE
ON PHOTORECEPTOR
(HALFTONE SCREEN STRUCTURE)
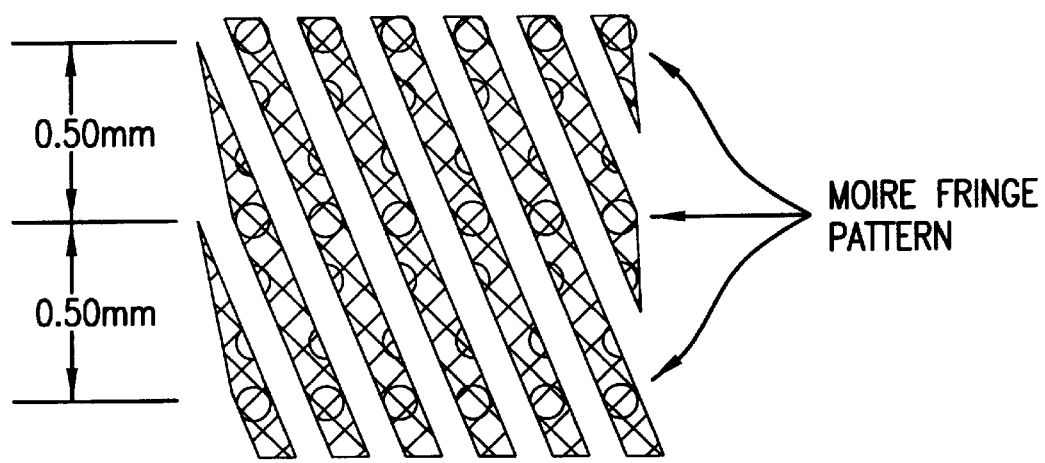
FIG.11c
FIXED IMAGE ON PRINT SHEET

IMAGE FORMING APPARATUS

BACKGROUND OF THE INVENTION

1. Field of the Invention

The present invention relates to an image forming apparatus such as a printer and a copying machine, employing a method to transfer a toner image formed on an image holder onto an intermediate transfer body and transfer and fix the toner image transferred on the intermediate transfer body onto a print sheet.

2. Description of the Related Art

Recently, a so-called digital electrophotographic image forming apparatus, which forms an electrostatic latent image on a photoreceptor by emitting a light beam such as a laser beam, modulated based on image information representing characters, images and the like, on the photoreceptor, has been widely used as a printer and a copying machine.

In this digital image forming apparatus, upon formation of halftone image, as well as black-and-white binary image, halftone is represented by a known method which forms an electrostatic latent image where the gradation is represented by a so-called dot structure or line structure, by ON/OFF modulation of light beam at a high speed. The dot structure and the line structure are referred to as a halftone screen where the gradation of image, i.e., gradation representation is made by the area size of dot or line. This method uses a relatively simple algorithm, and further, it can be realized at a low cost. Accordingly, the method is widely adopted in digital electrophotographic printers and copying machines.

On the other hand, in an image forming technique to develop an electrostatic latent image on a photoreceptor with dry toner into a toner image, then electrostatically transfer the toner image onto a print sheet, and fix the transferred image, the problem is that powder toner scatters in a transfer portion and the reproducibility of a halftone representation screen (halftone screen) structure (dot structure or line structure) is degraded. This may produce an image with conspicuous graininess.

To solve this problem, Japanese Published Examined Patent Application No. Sho 46-41679 discloses adhesion-transferring a toner image formed on a photoreceptor to an intermediate transfer body and heat-melt transferring toner from the intermediate transfer body to a print sheet. This method performs toner image transfer to the print sheet in a non-electrostatic manner, which suppresses degradation of image quality at the above-described transfer process.

Further, Japanese Published Unexamined Patent Application No. Hei 2-108072 discloses a transfer fixing method of forming a multi-color multiple toner image on an intermediate transfer body by transferring a plurality of toner images in different colors, while electrostatically overlapping the toner images, onto the intermediate transfer body, further, melting the multi-color multiple toner image on the intermediate transfer body, and transferring the melted multiple toner image onto a print medium, thus obtaining a color copy. This method also transfers the multiple toner image onto the print medium in a non-electrostatic manner, therefore, the degradation of image quality as described above can be mitigated.

As an image forming apparatus using the above transfer fixing method, U.S. Pat. No. 2,990,278, Japanese Published Unexamined Patent Application No. Hei 5-19642 and Japanese Published Unexamined Patent Application No. Hei 5-249798 disclose a technique to completely perform transfer of toner image from an intermediate transfer body to a print medium, by bringing the intermediate transfer body and the print medium into tight contact and heating them, then pressing them, thereafter, cooling the intermediate transfer body and the print medium until the cohesive force between the toner particles becomes greater than the adhesive force between the toner and the intermediate transfer body, and removing the print medium from the intermediate transfer body. This technique obtains a high quality image with a high toner transfer efficiency, a good color balance, high glossiness, and excellent toner transparency. Accordingly, to effectively utilize these advantages, studies have been made especially regarding the structure of the top layer of the intermediate transfer body. Silicone rubber, having an excellent toner transfer characteristic to a print sheet, is generally used as coating material.

On the surface of the photoreceptor, a number of independent toner called fogging toner exist as well as a toner image to form an image. The silicone rubber transfers almost all the toner including the fogging toner on the photoreceptor, due to its elasticity and viscosity, onto the surface of the intermediate transfer body. If the toner image on the photoreceptor surface is directly transferred onto the print sheet without the intermediate transfer body, as in the conventional art, the transfer is selectively performed by utilizing an electrostatic force, so as not to transfer the fogging toner. In this case, even if the fogging toner is transferred onto the print sheet, it cannot be recognized. However, in use of intermediate transfer body coated with silicone rubber as above, almost all the fogging toner is also transferred and fixed onto the print sheet, thus the image quality is degraded.

Further, as the silicone rubber has good leveling characteristic, the intermediate transfer body, coated with the silicone rubber, has a very smooth surface. Accordingly, the intermediate transfer body has a high friction coefficient with respect to the very smooth surface of the photoreceptor or the like. In the conventional color-image copying and printing, three or more color toner images are overlapped with each other to form a color image. In this case, the registration among the respective colors, i.e., positional shift significantly influences the image quality. If the surface of the intermediate transfer body is smooth, its friction coefficient with respect to the photoreceptor is high, and a slip occurs between a driving roll to drive the intermediate transfer body and the rear surface of the intermediate transfer body. Further, in a case where the driving force is increased by increasing the friction coefficient between the driving roll and the rear surface of the intermediate transfer body, if the direction of the force received from the driving roll and the direction of the force received from the photoreceptor coincide with each other, the intermediate transfer body can maintain the surface flat; however, generally, these directions do not strictly coincide due to a problem of mechanical precision, and ripples or the like are produced in the surface of the intermediate transfer body due to tension between these directions, and the intermediate transfer body cannot maintain the surface flat. As a result, a toner image on the photoreceptor surface cannot be transferred with high fidelity, and a defective image is formed.

Generally, to reduce the friction coefficient of rubber, the surface of the rubber is roughened. One of the roughening methods is performing spray coating while changing the conditions such as temperature, moisture and the distance to a spray gun, for preventing the silicone rubber from becoming mist, and viscosity or the like of the silicone rubber. Although this method produces small waves in the surface, the surface itself is still smooth. Accordingly, it is difficult to greatly reduce the friction coefficient.

Another roughening method using blast processing is blow-applying sand or steel particles so as to roughen the entire rubber surface by forming cavities in the rubber surface. However, as the friction coefficient is only slightly reduced, the transfer efficiency of fogging toner is not reduced. Further, the glossiness of image is greatly reduced, and unevenness occurs due to nonuniform roughness, accordingly, the image quality is greatly degraded.

SUMMARY OF THE INVENTION

The present invention has been made to solve the above problems, and has its object to provide an image forming apparatus which represents gradation (gradation) of image by using a halftone screen structure such as a dot structure or line structure, and which transfers and fixes an image onto a print medium by using an intermediate transfer body where a number of protruding portions are arranged with an approximately uniform distribution, wherein the degradation of image quality due to a moire fringe pattern produced by the halftone screen structure and the arrangement of the protruding portions can be reduced.

According to one aspect of the present invention, the foregoing object is attained by providing an image forming apparatus comprising: a plurality of toner image formation units that form toner images with toner in different colors on an image holder, by using a halftone representation screen to represent gradation of an image by the area size of a dot or line; and an intermediate transfer fixing unit that transfers the toner images on the image holder onto an intermediate transfer body, then holds the transferred toner images between the intermediate transfer body and a print medium, and transfers and fixes the transferred toner images onto the print medium by at least heating, wherein the surface of the intermediate transfer body has a number of protruding portions arranged with an approximately uniform distribution, and wherein at least one of the distribution of the protruding portions or the structure of the halftone representation screen is controlled such that, regarding moire fringe patterns generated by the protruding portions and the toner images in the respective colors formed by using the halftone representation screen, a pitch of a moire fringe pattern produced by the protruding portions and a toner image in a color of the lowest lightness is not longer than pitches of moire fringe patterns produced by the protruding portions and toner images in other colors.

Further, according to another aspect of the present invention, the foregoing object is attained by providing an image forming apparatus comprising: a plurality of toner image formation units that form toner images with toner in different colors on an image holder, by using a halftone representation screen to represent gradation of an image by the area size of a dot or line; and an intermediate transfer fixing unit that transfers the toner images on the image holder onto an intermediate transfer body, then holds the transferred toner images between the intermediate transfer body and a print medium, and transfers and fixes the transferred toner images onto the print medium by at least heating, wherein the surface of the intermediate transfer body has a number of protruding portions arranged with an approximately uniform distribution, and wherein at least one of the distribution of the protruding portions or the structure of the halftone representation screen is controlled such that, regarding moire fringe patterns produced by the protruding portions and the toner images of the respective colors, formed by using the halftone representation screen, a pitch of a moire fringe pattern produced by the protruding portions and a toner image in a color of the highest lightness is longer than pitches of moire fringe patterns produced by the protruding portions and toner images in other colors.

Further, according to another aspect of the present invention, the foregoing object is attained by providing an image forming apparatus comprising: a plurality of toner image formation units that form toner images on an image holder, by using a halftone representation screen to represent gradation of an image by the area size of a dot or line; and an intermediate transfer fixing unit that transfers the toner images on the image holder onto an intermediate transfer body, then holds the transferred toner images between the intermediate transfer body and a print medium, and transfers and fixes the transferred toner images onto the print medium by at least heating, wherein the surface of the intermediate transfer body has a number of protruding portions arranged with an approximately uniform distribution, and wherein at least one of the distribution of the protruding portions or the structure of the halftone representation screen is controlled such that a pitch of a moire fringe pattern produced by the protruding portions and the toner images formed by using the halftone representation screen is equal to or shorter than 0.5 mm.

The present inventors have empirically obtained the fact that the visibility of moire fringe pattern is the highest when toner of the lowest lightness is used, while the visibility of moire fringe pattern is the lowest when toner of the highest lightness is used, and that in use of any color, the visibility of moire fringe pattern is lower as the pitch of the moire fringe pattern is shorter.

The first aspect of the present invention has been made based on the above fact. The degradation of image quality is suppressed by controlling at least one of the distribution of the protruding portions or the halftone representation screen such that the pitch of the moire fringe pattern produced by the toner image in the lowest lightness color and the protruding portions of the intermediate transfer body is not longer than the pitches of the moire fringe patterns produced by the other color toner images and the protruding portions of the intermediate transfer body. That is, the degradation of image quality is suppressed by controlling at least one of the distribution of the protruding portions and the halftone representation screen such that the pitch of the moire fringe pattern produced by the toner image in the lowest lightness color and the protruding portions of the intermediate transfer body is shorter than or equal to the pitches of the moire fringe patterns produced by the toner images in the other colors than the lowest lightness color and the protruding portions of the intermediate transfer body.

Further, the second aspect of the present invention has been made so as to suppress the degradation of image quality by controlling at least one of the distribution of the protruding portions of the intermediate transfer body and the halftone representation screen such that the pitch of the moire fringe pattern produced by the toner image in the highest lightness color and the protruding portions of the intermediate transfer body is not shorter than the pitches of the moire fringe patterns produced by the toner images in the other colors than the highest lightness color and the protruding portions of the intermediate transfer body. That is, the degradation of image quality is suppressed by controlling at least one of the distribution of the protruding portions of the intermediate transfer body and the halftone representation screen such that the pitch of the moire fringe pattern produced by the toner image in the highest lightness color and the protruding portions of the intermediate transfer body is longer than or equal to the pitches of the moire fringe patterns produced by the toner images in the other colors than the highest lightness color and the protruding portions of the intermediate transfer body.

Further, the present inventors have empirically obtained the fact that in any color toner, if the pitch of moire fringe pattern is shorter than 0.5 mm, the visibility of the moire fringe pattern abruptly becomes lower, which reduces the degradation of image quality. The third aspect of the present invention has been made based on the above fact. The degradation of image quality is suppressed by controlling at least one of the structure of the protruding portions on the surface of the intermediate transfer body and the structure of the halftone representation screen such that the pitch of moire fringe pattern is 0.5 mm or shorter (50 or more lines per inch).

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a block diagram showing a light-beam pulse-width modulator;

FIG. 4A is a conceptual diagram showing an image density signal;

FIG. 4B is a timing chart showing an SOS signal and a triangular wave;

FIG. 4C is an explanatory view showing a line screen having a screen angle of θ°;

FIG. 5A is a conceptual diagram showing the image density signal;

FIG. 5B is a timing chart showing the SOS signal and the triangular wave;

FIG. 5C is an explanatory view showing the line screen having a screen angle of θ°;

FIG. 11A is a conceptual diagram showing the surface of the intermediate transfer body;

FIG. 11B is a conceptual diagram showing a halftone screen structure;

FIG. 11C is a conceptual diagram showing an image fixed onto a print sheet; and

DETAILED DESCRIPTION OF THE PREFERRED EMBODIMENTS

Figure 1:
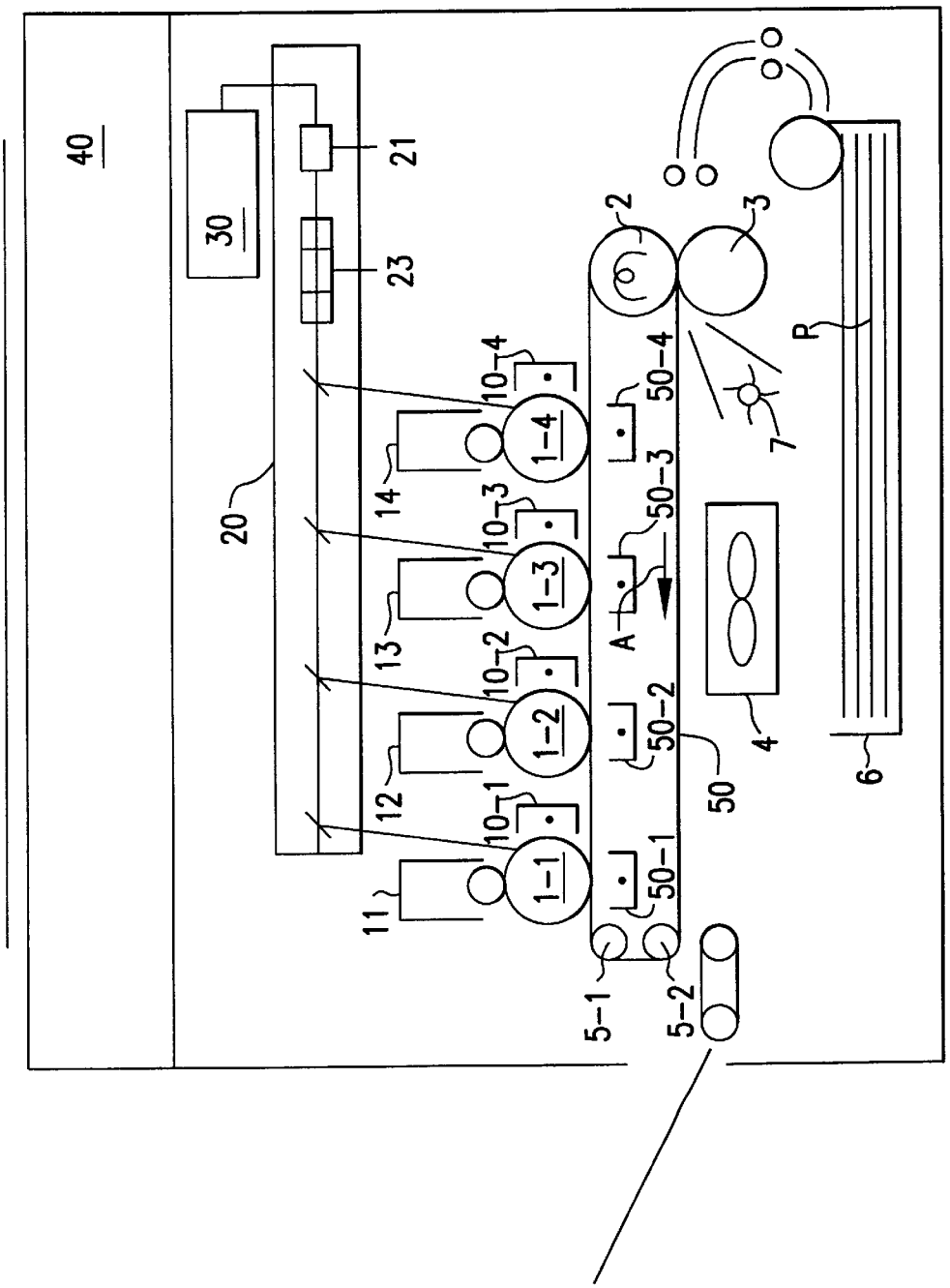
FIG. 1 is a schematic cross-sectional view showing an image forming apparatus using an intermediate transfer body.
Figure 8:
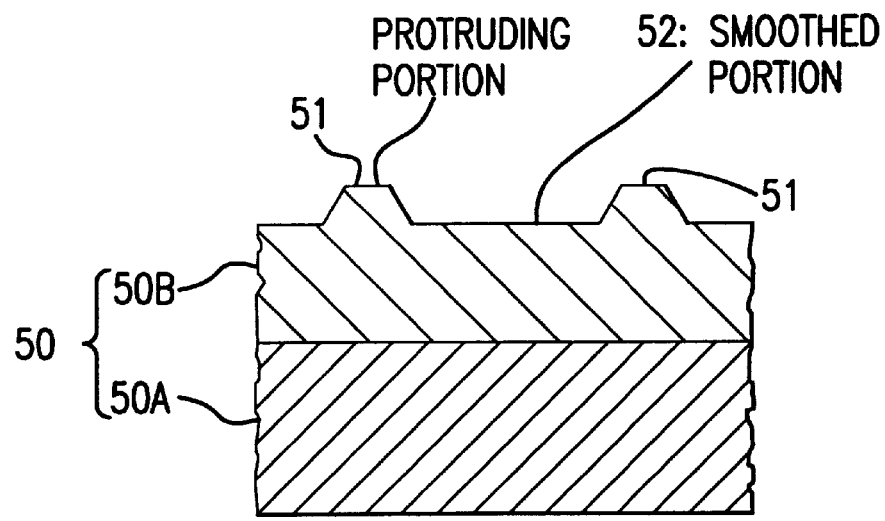
FIG. 8 is a cross-sectional view showing a belt-type intermediate transfer body.

Hereinbelow, a preferred embodiment of the present invention will now be described in detail in accordance with the accompanying drawings. As shown in FIG. 1, a color image forming apparatus according to the present embodiment comprises a belt-type intermediate transfer body 50 having a rough structure on its surface. As shown in FIG. 8, the intermediate transfer body 50 has a base layer 50A and a surface layer 50B. Conventionally, polyimide, polyetheretherketone (PEEK), polyallylenesulfide (PAS), polyimideamide, polyethersulfone (PES), polyethernitryl (PEN), thermoplastic polyimide or the like is used as the base layer 50A as the base of the intermediate transfer body, and polyimide is often used by the requirement of thermal resistance and mechanical strength. In the present embodiment, a carbon-black added polyimide film having a thickness of 80 $\mu$m is used as the base layer 50A. To electrostatically transfer a toner image from a photoreceptor onto the intermediate transfer body without any disturbance in the image, the content of the carbon black of the polyimide is varied to control the volume resistance from $10^8$ $\Omega$cm to $10^{11}$ $\Omega$cm.

Further, also to electrostatically transfer a toner image from the photoreceptor onto the intermediate transfer body without any disturbance in the image, the surface layer 50B has volume resistance of $10^{12}$ $\Omega$cm to $10^{15}$ $\Omega$cm. Further, upon simultaneous transfer and fixing from the intermediate transfer body to a print sheet, to improve the tight contact between the intermediate transfer body and the print sheet as a print medium, with the toner image therebetween, and to improve removal of toner and thermal resistance, the surface of the base layer 50A is coated with silicone rubber having rubber hardness of 40° and a thickness of 50 $\mu$m, and the silicone rubber is mold-pressed by a method to be described later, as a silicone rubber portion on the surface where a number of protruding portions 51 are formed with a uniform distribution on a smooth portion 52.

The belt-type intermediate transfer body 50 is supported by rollers 5-1, 5-2, and a heating roll 2 containing a heat source as a heat generator, and rotated in an arrow A direction. The heating roll 2 is opposite to a pressing roll 3, such that the intermediate transfer body 50 is held between the heating roll 2 and the pressing roll 3. The positions of the heating roll 2 and the pressing roll 3 may be replaced with each other. Further, the pressing roll 3 may be a heating roll having a heat source inside. Four photoreceptor drums 1-1 to 1-4 as image holders are sequentially provided around the intermediate transfer body 50. The respective photoreceptor drums are uniformly charged by chargers 10-1 to 10-4, and scan-exposed by a light beam scanner 20 which scans a light beam ON/OFF modulated in accordance with an image density signal by a light-beam pulse-width modulator (PWM) 30. Then, electrostatic latent images each having a halftone representation screen (halftone screen) structure are formed. The electrostatic latent images on the respective photoreceptor drums are developed by developers 11 to 14 respectively containing black (BK), yellow (Y), magenta (M) and cyan (C) color toner, and respective color toner images, each having the halftone screen structure formed by dots or lines, are formed as so-called digital images on the respective photoreceptor drums. The color toner images are sequentially transferred by the transfer units 50-1 to 50-4 onto the intermediate transfer body 50, and the plural color images are overlapped on the intermediate transfer body 50.

The pressing roll 3 presses a print sheet P supplied from a tray 6 against the intermediate transfer body 50 positioned on an external circumferential surface of the heating roll 2. Then, the portion of multiple color toner image on the intermediate transfer body and the print sheet P are moved in synchronization with each other between the heating roll 2 and the pressing roll 3, and pressed and heated in a heating area. The toner heated to its melting temperature or higher is softened and melted, then permeates into the print sheet P, and is hardened, thus transfer-fixed on the print sheet.

A heating-area exit cooling device 7 is provided closely behind the heating area where the portion of multiple color toner image on the intermediate transfer body and the print sheet pass. The heating-area exit cooling device 7 is provided to reduce the temperature of the toner immediately after it passed the heating area. A similar advantage can be obtained by arranging such that the cooling device 7 cools the portion of multiple color toner image on the intermediate transfer body immediately after it passed the heating area, from the intermediate transfer body side. Further, a similar advantage can be obtained by arranging such that the cooling device 7 cools the print sheet and the portion of multiple color toner image on the intermediate transfer body, from both print sheet side and intermediate transfer body side. This cooling increases the cohesive force of the toner, and prevents offset of the toner on the transfer body upon removal of print sheet.

Further, a cooler 4, comprising a cooling fan or the like, to cool the intermediate transfer body 50 and the print sheet P integrally conveyed from the heating pressing area, is provided on the downstream side of the heating-area exit cooling device 7. The toner coheres by the cooling operation of the cooler 4, and a strong adhesive force is generated between the toner and the print sheet P. The intermediate transfer body 50 and the print sheet P cooled by the cooler 4 are conveyed in a paper-discharge tray direction, and the print sheet P is removed, with the toner, from the intermediate transfer body 50 by the firmness of the print sheet itself, on the roll 5-2 having a small curvature radius. Thus, a color image is formed. The surface of the toner image transferred and fixed on the print sheet P has a rough structure corresponding to the surface of the intermediate transfer body 50.

As the photoreceptor provided on the surfaces of the photoreceptor drums 1-1 to 1-4, various organic photoreceptors as well as various inorganic photoreceptors (Se, a-Si, a-SiC, Cds and the like) may be used.

The color toner comprises thermoplastic binder of well-known material containing coloring matters such as yellow, magenta and cyan. Further, the exposure condition or development condition is set such that the amount of toner in each color on a print sheet is about 0.4 mg/cm$^2$ to 0.7 mg/cm$^2$ depending on the content of the coloring matter. In the present embodiment, the amount of each color toner is 0.65 mg/cm$^2$.

As the heating roll and the pressing roll, a metal roll or a metal roll having a thermal-resistant elastic layer of silicone rubber or the like on its surface may be used. The heating roll includes a heat source, and the heating temperature of the heat source is controlled such that the toner temperature in the heating area becomes the toner melting temperature or higher. Further, in the heating area, a nipping pressure force is set as a pressing force to bring the intermediate transfer body 50, the toner image and the print sheet P into sufficiently tight contact while preventing occurrence of partially removed portion, and occurrence of wrinkle or shift in the print sheet P. In use of the toner in the present embodiment, the nipping pressure force appropriately ranges from $1 \times 10^5$ Pa to $1 \times 10^6$ Pa. In the present embodiment, a hollow aluminum roll with a layer of silicone rubber having a hardness of 55° and a thickness of 3 mm is used as the heating roll and the pressing roll, and a halogen lamp is used as the heat source in the heating roll. Note that the nipping pressure force is set to $5.5 \times 10^5$ Pa.

Figure 2:
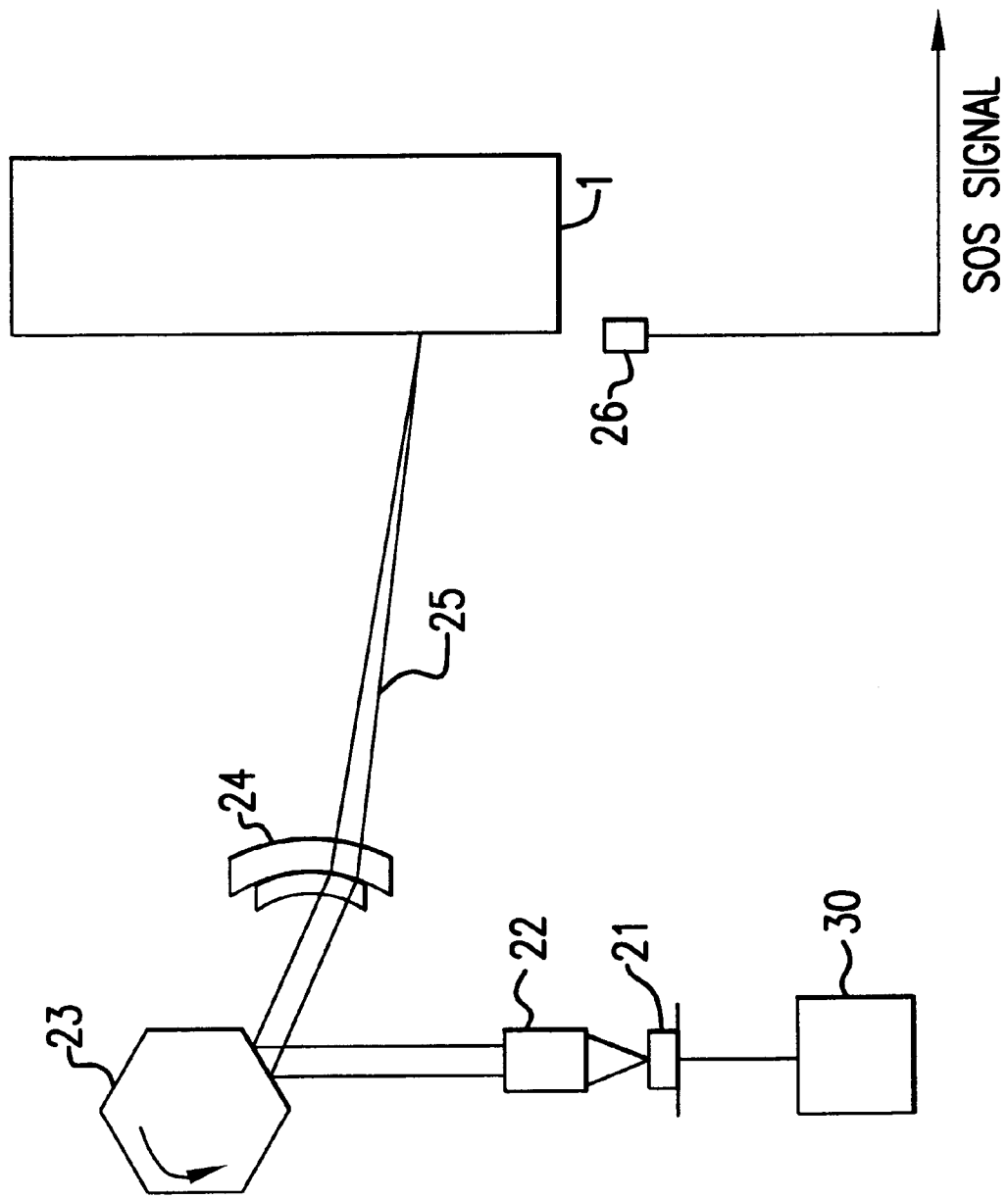
FIG. 2 is a schematic diagram showing a light-beam scanner.

As shown in FIG. 2, the light beam scanner 20 comprises a semiconductor laser 21 ON/OFF controlled by the light-beam pulse-width modulator 30. The semiconductor laser 21 emits a laser beam ON/OFF modulated by the ON/OFF control. The laser beam is collimated by a collimator lens 22, and repeatedly reflection-deflected by a polygon mirror 23 rotating the arrow direction, and further, via an fθ lens 24 to control a spot diameter on the photoreceptor drum 1 and move the spot at a constant speed on the photoreceptor drum 1, repeatedly scanned along a main scanning direction (up-and-down direction in FIG. 2) on the photoreceptor drum 1, as a light beam 25 holding image information. The start point of each scanning of the light beam 25 is sensed by an optical sensor 26 for generating a scan-start signal, and an SOS (Start Of Scan) signal indicating the start of each scanning is inputted into the light-beam pulse-width modulator 30.

As shown in FIG. 3, the light-beam pulse-width modulator 30 comprises a triangular wave oscillator 31 which generates two types of triangular waves having different cycle frequencies, a selector 33 which selects one of the triangular waves in accordance with a discrimination signal to discriminate a halftone image from a character image, and a D/A converter 34 which converts a digital image signal into an analog image signal. The selector 33 and the D/A converter 34 are connected to a comparator 32 which compares the level of the analog image signal with the level of the triangular wave and outputs a binary signal having a pulse width corresponding to the level of the analog image signal.

Next, description will be made on a case where the light-beam pulse-width modulator 30 generates a line-structured halftone screen. The triangular wave oscillator 31 alternately generates two types of triangular waves having different cycle frequencies as shown in FIG. 3, and inputs the triangular waves into the selector 33. The selector 33 selects a triangular wave based on the discrimination signal discriminating a halftone image from a character image (binary image). In case of halftone image, the selector 33 selects a triangular wave having a low cycle frequency, while in case of character image, selects a triangular wave having a high cycle frequency. The selected triangular wave is inputted into one terminal of the comparator 32.

On the other hand, an image signal (digital signal), obtained by image reading from an original by an original reading unit 40 (FIG. 1) of the color image forming apparatus, is inputted into the D/A converter 34, then converted into an analog signal, and inputted into the other terminal of the comparator 32. The comparator 32 compares the level of the analog image signal with the level of the triangular wave, and outputs a signal which becomes high when the level of the analog image signal is higher than that of the triangular wave, i.e., a binary signal having a pulse width which becomes wider as the level of the analog image signal becomes higher. The binary signal is inputted into the semiconductor laser 21 as shown in FIG. 2. The semiconductor laser 21 emits a laser beam where ON/OFF states are repeated in accordance with the input binary signal. In this method, one period of the triangular wave corresponds to the pitch of the line structure in the main scanning direction. The pitch of the line structure can be changed by changing the one period of the triangular wave. Specifically, the change of the pitch can be realized by changing the count value of a high-frequency clock determining rising and falling timings of the triangular wave.

FIGS. 4A and 4B and FIGS. 5A and 5B show the control of the screen angle of the line structure. Note that as shown in FIGS. 4A and 5A, an image density signal having a density value of "128", representing 256 gradation levels by 8 bits, is used as an image signal. As shown in FIG. 4B, if the falling timing of the SOS signal indicative of the start of main scanning and the rising timing of the triangular wave are the same in each main scanning, a line structure consisting of a number of vertical lines is formed as an output image, as shown in FIG. 4C. On the other hand, as shown in FIG. 5B, if the falling timing of the SOS signal indicative of the start of main scanning and the rising timing of the triangular wave are shifted in each main scanning, a line structure consisting of a number of slant lines is formed as an output image, as shown in FIG. 5C. The screen angle ("θ" in FIG. 5C) formed by the horizontal line (main-scanning line) and the line element can be varied by changing the rising timing of each triangular wave with respect to the falling timing of the SOS signal. In this manner, a line-structured halftone screen is generated.

Figures 6A, 6B, 6C, 6D:
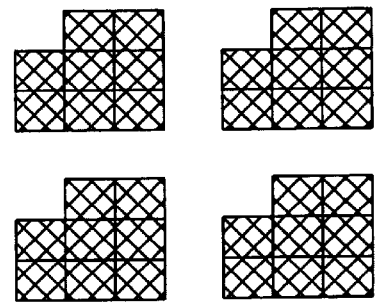
FIG. 6A is a conceptual diagram showing the image density signal.
FIG. 6B is a conceptual diagram showing a dot pattern formation filter.
FIG. 6C is a conceptual diagram showing the result of dot pattern formation processing.
FIG. 6D is an explanatory view showing a dot screen having a screen angle of θ°.
Figures 7A, 7B, 7C, 7D:
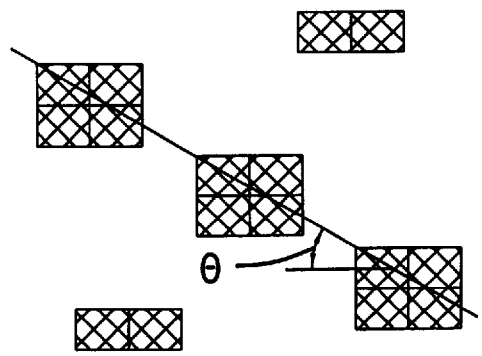
FIG. 7A is a conceptual diagram showing the image density signal.
FIG. 7B is a conceptual diagram showing the dot pattern formation filter.
FIG. 7C is a conceptual diagram showing the result of dot pattern formation processing.
FIG. 7D is an explanatory view showing the dot screen having a screen angle of θ°.

Next, generation of dot-structured halftone screen will be described. Dot-pattern filtering processing is performed on an image signal obtained by image reading from an original by the original reading unit 40, before the image signals inputted into the light-beam pulse-width modulator 30. FIGS. 6A to 6D and 7A to 7D show image density signals in dot-pattern filtering processing, dot-pattern formation filters, dot-pattern formation results, and output images. As shown in FIG. 6A, a signal having a density value of "128" is used as the image density signal, and as shown in FIG. 6B, a filter which converts a density value less than given density values ("15", "31", "47", "63", . . . "255" in FIG. 6B) into a value "0", while converts a density value greater than the given density values into a value "255" is used as the dot-pattern formation filter. Further, as shown in FIG. 7A, a signal having a density value of "64" is used as the image density signal, and as shown in FIG. 7B, a filter which converts a density value less than given density values ("15", "31", "47", "63", . . . "255" in FIG. 7B) into a value "0", while converts a density value greater than the given density values into a value "255" is used as the dot-pattern formation filter.

The image signal obtained by image reading from an original by the original reading unit 40 is compared with the respective density values of the dot-pattern formation filter, and binarized as shown in FIG. 6C or 7C, and converted into a "0" or "255" density value. Then the signal is outputted via the D/A converter 34 of the light-beam pulse-width modulator 30 and the comparator 32, to the semiconductor laser 21. Thus, a dot structured halftone screen is generated as shown in FIG. 6D or 7D. The interval between dots and the screen angle formed by the horizontal line (main-scanning line) and a line connecting the respective dots ("θ" in FIG. 7D) can be controlled by changing the each numerical value (density value) of the dot-pattern formation filter.

Figure 9:
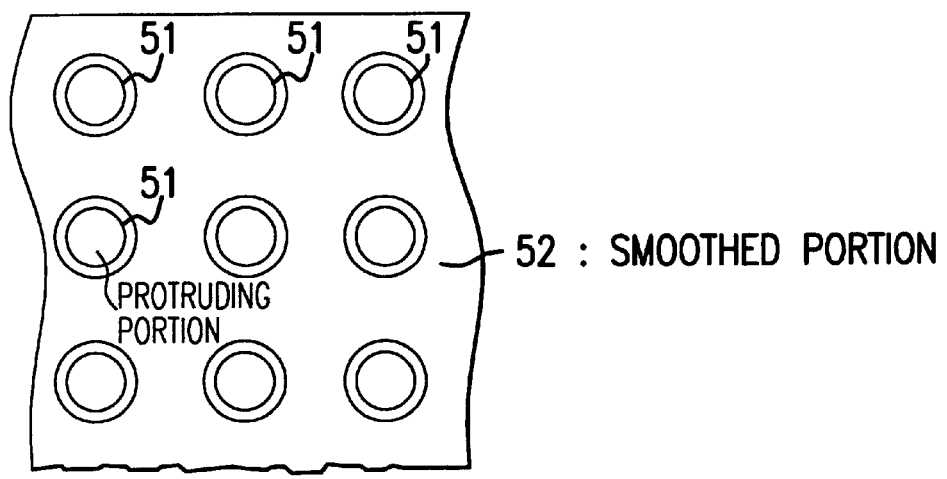
FIG. 9 is a partial plane view of the belt-type intermediate transfer body.

Next, description will be made on the surface structure of the belt-type intermediate transfer body 50 where a number of protruding portions 51 are provided with a uniform distribution on the smooth portion 52 as a smooth surface. FIG. 8 is a cross-sectional view showing the belt-type intermediate transfer body 50. FIG. 9 is a partial plane view of the belt-type intermediate transfer body 50. The large number of protruding portions 51 are arranged in matrix by providing protruding portion arrays, each having protruding portions 51 linearly arrayed at predetermined intervals, at the same predetermined intervals, such that the distribution of the protruding portions 51 is approximately uniform with respect to the smooth portion 52. Note that the arrays of the matrix may be shifted by ½ of the interval between protruding portions, such that the protruding portions are zigzag arranged, or the large number of protruding portions may be provided at random.

Figure 10:
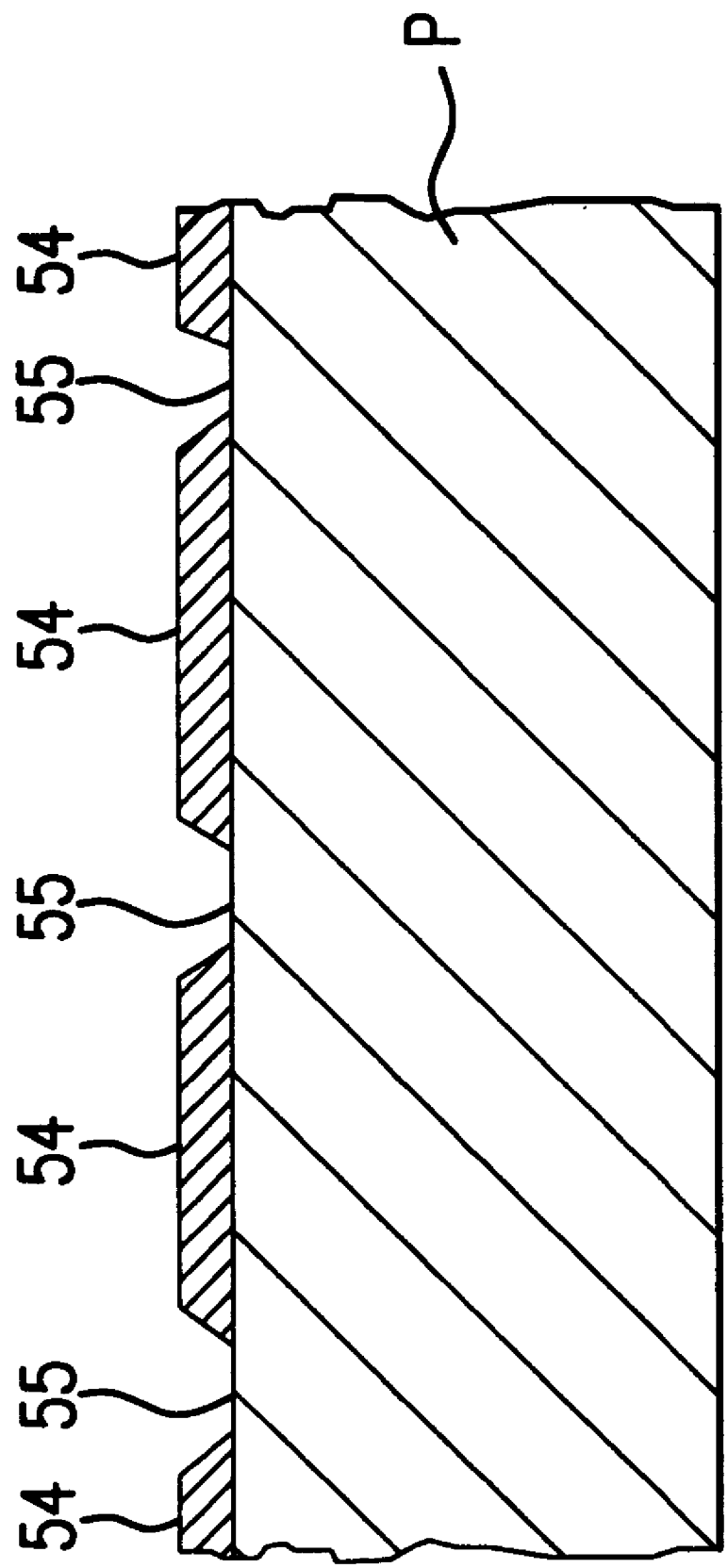
FIG. 10 is a cross-sectional view showing a mold to form protruding portions on the surface of the intermediate transfer body.

The above-mentioned surface structure of the intermediate transfer body can be formed by mold-pressing. Next, the method for forming the mold will be described. Conventionally, the mold is formed by processing metal to have very small recessed portions to form protruding portions on a flat surface. However, in the present invention, the mold for mold-pressing is formed by utilizing a toner image by an electrophotographic printer with a high resolution of, e.g., 1200 dpi. That is, as shown in FIG. 10, a toner image 54 is formed at a position corresponding to the smooth portion of the intermediate transfer body, while images are not formed at positions corresponding to the protruding portions of the intermediate transfer body such that toner is not attached at such positions. As a result, an image, where the toner image 54 includes recessed portions 55 to form the protruding portions, is printed on the print sheet P, and the print sheet P is used as the mold for press-molding. In this case, the interval between recessed portions 55, the depth of the recessed portion 55, and the diameter of the recessed portion 55 are controlled to target values by changing the number of overlapped toner layers, the resolution (the number of lines/inch), and the percentage of the toner image area. For example, in a case where a paper mold is formed by printing an image, formed by using one toner layer of one color toner, having a resolution of 150 lines/inch and a toner-image area percentage of 90%, on a print sheet, and the paper mold is used to form protruding portions on the surface of the intermediate transfer body, the height of the protruding portion on the surface of the intermediate transfer body is about 4 μm, and the interval between protruding portions is 0.17 mm, and the area percentage of the protruding portions is 10%. The interval between protruding portions and the screen angle can be controlled by changing a print pattern by the high-resolution electrophotographic printer. Further, the screen angle can be controlled by changing the angle to place a print sheet on the intermediate transfer body.

In this manner, the formation of the large number of protruding portions with an approximately uniform distribution on the surface of the intermediate transfer body reduces the area of contact between the photoreceptor and the intermediate transfer belt, and reduces the friction coefficient between the intermediate transfer belt and the photoreceptor, to facilitate running control on the intermediate transfer body, and further, reduces the transfer efficiency of fogging toner, to prevent the degradation of image quality. Further, the smooth portion of the surface of the intermediate transfer body prevents extreme reduction of image glossiness.

Next, the generation of moire fringe pattern will be described regarding a case where a toner image is formed by using the above-mentioned halftone screen structure, and the toner image is transferred and fixed onto a print sheet by using the intermediate transfer body having the large number of protruding portions with an approximately uniform distribution. Note that a moire fringe pattern is a pattern produced when regularly-distributed dots or lines overlap with each other.

As shown in FIG. 11B, a latent image is formed by a line screen having a pitch of 158 lines/inch (0.16 mm interval) and a screen angle of 71.6°, and a toner image is formed by development. Then as shown in FIG. 11A, the intermediate transfer body, having a number of protruding portions, provided at a pitch of 150 lines/inch (0.17 mm interval) and at a screen angle of 0°, is used for transferring and fixing the toner image onto a print sheet. In this case, a moire fringe pattern is produced. As shown in FIG. 11C, shadow-like horizontal stripes at a pitch of 50 lines/inch (0.50 mm interval) due to the protruding portions of the intermediate transfer body occur in the fixed toner image, which degrades the image quality.

The following Table 1 shows pitches of moire fringe patterns in a case where the pitch of the halftone screen and the screen angle are changed while the screen angle of the protruding portion is fixedly 0° and the interval between protruding portions is set to 0.17 mm (150 lines/inch) and 0.13 mm (200 lines/inch). It can be understood from the table that the pitch of moire fringe pattern can be changed by controlling the protruding structure on the surface of the intermediate transfer body and the halftone screen structure.

TABLE 1

|  | Interval between Protruding portions of Intermediate Transfer Belt: 0.17 mm (150 lines/inch) | Interval between Protruding portions of Intermediate Transfer Belt: 0.13 mm (200 lines/inch) |
| --- | --- | --- |
| Line Screen Pitch: 0.17 mm (151 lines/inch) Angle: 85° | Moire Fringe Pattern Pitch: 2.0 mm (12.5 lines/inch) | Moire Fringe Pattern Pitch: 0.49 mm (52 lines/inch) |
| Line Screen Pitch: 0.17 mm (152 lines/inch) Angle: 81° | Moire Fringe Pattern Pitch 1.0 mm (25 lines/inch) | Moire Fringe Pattern Pitch: 0.45 mm (56 lines/inch) |
| Line Screen Pitch: 0.16 mm (158 lines/inch) Angle: 72° | Moire Fringe Pattern Pitch 0.51 mm (50 lines/inch) | Moire Fringe Pattern Pitch: 0.36 mm (71 lines/inch) |
| Dot Screen Pitch: 0.15 mm (175 lines/inch) Angle: 90° (= 0°) | Moire Fringe Pattern Pitch 1.0 mm (25 lines/inch) | Moire Fringe Pattern Pitch: 1.0 mm (25 lines/inch) |
| Dot Screen Pitch: 0.14 mm (185 lines/inch) | Moire Fringe Pattern Pitch 0.73 mm | Moire Fringe Pattern Pitch: 1.7 mm |

TABLE 1-continued

|  | Interval between Protruding portions of Intermediate Transfer Belt: 0.17 mm (150 lines/inch) | Interval between Protruding portions of Intermediate Transfer Belt: 0.13 mm (200 lines/inch) |
| --- | --- | --- |
| Angle: 90° (= 0°) Dot Screen Pitch: 0.15 mm (175 lines/inch) Angle: 60° (= 30°) | (35 lines/inch) Moire Fringe Pattern Pitch 0.29 mm (88 lines/inch) | (15 lines/inch) Moire Fringe Pattern Pitch: 0.25 mm (100 lines/inch) |

The next Table 2 shows the difference in visibility on the respective conditions in Table 1. Note that toner used in this case is color toner corresponding to respective black (BK), yellow (Y), cyan (C) and magenta (M) colors, used in Acolor 935 (trade name), a printer manufactured by Fuji Xerox Co., Ltd., and as a print sheet, white J coat paper (trade name) also manufactured by Fuji Xerox Co., Ltd. is employed. The judgment of visibility is made by 20 people (10 men and 10 women) as three-step sensory evaluation. If the moire fringe pattern is not conspicuous, 3 points are given; if the moire fringe pattern is conspicuous but it is bearable, 2 points are given; and if the moire fringe pattern is unbearable, 1 point is given. Table 2 shows the number of people corresponding to each evaluation points and average points, for each toner color.

It can be understood from Table 2 that the degree of visibility of moire fringe pattern changes depending on the pitch of moire fringe pattern and toner color.

TABLE 2

|  |  | Interval between Protruding portions of Intermediate Transfer Belt: 0.17 mm (150 lines/inch) | | | | | Interval between Protruding portions of Intermediate Transfer Belt: 0.13 mm (200 lines/inch) | | | |
| --- | --- | --- | --- | --- | --- | --- | --- | --- | --- | --- |
| Line Screen | | Points 3 | 2 | 1 | Average | Points | 3 | 2 | 1 | Average |
| Pitch: 0.17 mm (151 lines/inch) Angle: 85° | BK Y M C | 0 2 0 0 | 0 16 12 14 | 20 2 8 6 | 1.0 2.0 1.6 1.7 | BK Y M C | 11 20 14 14 | 9 0 6 6 | 0 0 0 0 | 2.6 3.0 2.7 2.7 |
| Line Screen | | Points 3 | 2 | 1 | Average | Points | 3 | 2 | 1 | Average |
| Pitch: 0.17 mm (152 lines/inch) Angle: 81° | BK Y M C | 0 2 0 0 | 2 18 12 16 | 18 0 8 4 | 1.1 2.1 1.6 1.8 | BK Y M C | 8 20 12 13 | 12 0 8 7 | 0 0 0 0 | 2.4 3.0 2.7 2.7 |
| Line Screen | | Points 3 | 2 | 1 | Average | Points | 3 | 2 | 1 | Average |
| Pitch: 0.16 mm (158 lines/inch) Angle: 72° | BK Y M C | 10 16 10 8 | 10 4 10 12 | 0 0 0 0 | 2.5 2.8 2.5 2.4 | BK Y M C | 12 20 15 16 | 8 0 5 4 | 0 0 0 0 | 2.6 3.0 2.8 2.8 |
| Dot Screen | | Points 3 | 2 | 1 | Average | Points | 3 | 2 | 1 | Average |
| Pitch: 0.15 mm (175 lines/inch) Angle: 90° (= 0°) | BK Y M C | 0 2 0 0 | 0 16 13 14 | 20 2 7 6 | 1.0 2.0 1.7 1.7 | BK Y M C | 0 2 0 0 | 2 18 12 16 | 18 0 8 4 | 1.1 2.1 1.6 1.8 |
| Dot Screen | | Points 3 | 2 | 1 | Average | Points | 3 | 2 | 1 | Average |
| Pitch: 0.14 mm (185 lines/inch) Angle: 90° (= 0°) | BK Y M C | 0 4 0 0 | 3 16 16 14 | 17 0 4 6 | 1.2 2.2 1.8 1.7 | BK Y M C | 0 2 0 0 | 4 18 10 12 | 16 0 10 8 | 1.2 2.1 1.5 1.6 |

TABLE 2-continued

|  |  | Interval between Protruding portions of Intermediate Transfer Belt: 0.17 mm (150 lines/inch) | | | | Interval between Protruding portions of Intermediate Transfer Belt: 0.13 mm (200 lines/inch) | | | |
| --- | --- | --- | --- | --- | --- | --- | --- | --- | --- |
| Dot Screen |  | Points | 3 | 2 | 1 | Average | Points | 3 | 2 | 1 | Average |
| Pitch: 0.15 mm | BK | 12 | 8 | 0 | 2.6 | BK | 14 | 6 | 0 | 2.7 |
| (175 lines/inch) | Y | 20 | 0 | 0 | 3.0 | Y | 20 | 0 | 0 | 3.0 |
| Angle: 60 ° | M | 16 | 4 | 0 | 2.8 | M | 18 | 2 | 0 | 2.9 |
| (= 30 °) | C | 17 | 3 | 0 | 2.9 | C | 16 | 4 | 0 | 2.8 |

Figure 12:
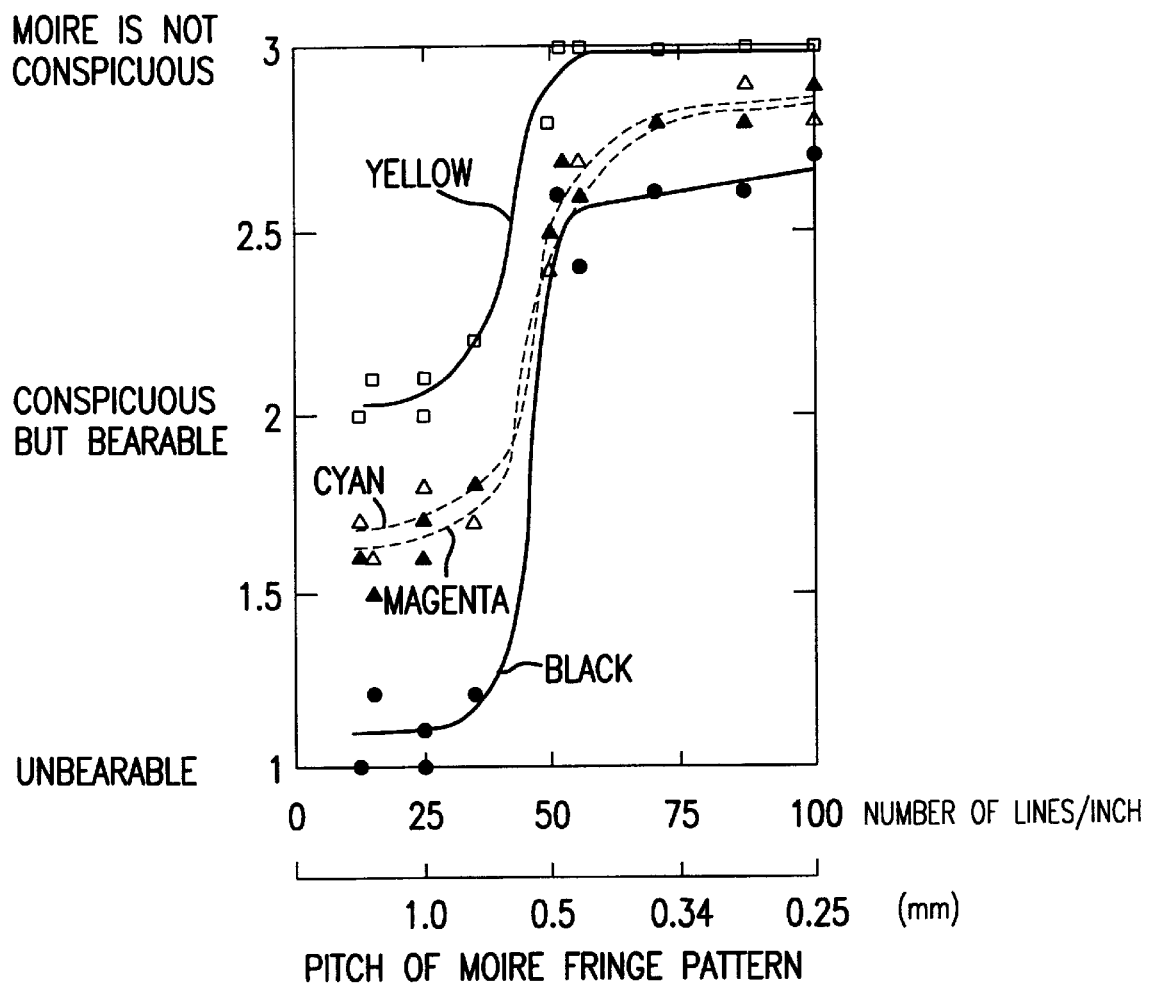
FIG. 12 is a graph showing the relation between the pitch of moire fringe pattern and evaluation points.

FIG. 12 is a graph showing the relation between the pitch of moire fringe pattern and evaluation points. It is understood from FIG. 12 that at any moire pitch, the visibility of moire fringe pattern when using black toner is the highest, and the image quality is greatly degraded. On the other hand, the visibility of moire fringe pattern when using yellow toner is the lowest, and the image quality is not so greatly degraded. Further, in use of any color toner, as the moire pitch is shorter, the visibility of moire fringe pattern is lower, thereby the degradation of image quality is suppressed.

As described above, if the pitch of moire fringe pattern produced by the black toner image and the protruding portions of the intermediate transfer body is longer than the pitches of moire fringe patterns produced by other color toner images and the protruding portions of the intermediate transfer body, the degradation of image quality is the greatest. In other words, it can be understood that the degradation of image quality can be suppressed by arranging such that the pitch of moire fringe pattern produced by a toner image in the lowest lightness color and the protruding portions of the intermediate transfer body is not longer than the pitches of moire fringe patterns produced by other color toner images and the protruding portions of the intermediate transfer body. That is, the degradation of image quality can be suppressed by arranging such that the pitch of moire fringe pattern produced by a toner image in the lowest lightness color and the protruding portions of the intermediate transfer body is shorter than or equal to the pitches of moire fringe patterns produced by other color toner images and the protruding portions of the intermediate transfer body.

Further, if moire pitches are the same, the visibility of moire fringe pattern when using yellow toner is the lowest. Accordingly, if the pitch of moire fringe pattern produced by the yellow toner image and the protruding portions of the intermediate transfer body is the shortest, the image degradation is the greatest. In other words, it can be understood that the degradation of image quality can be suppressed by arranging such that the pitch of moire fringe pattern produced by a toner image in the highest lightness color and the protruding portions of the intermediate transfer body is not shorter than the pitches of moire fringe patterns produced by other color toner images and the protruding portions of the intermediate transfer body. That is, the degradation of image quality can be suppressed by arranging such that the pitch of moire fringe pattern produced by a toner image in the highest lightness color and the protruding portions of the intermediate transfer body is longer than or equal to the pitches of moire fringe patterns produced by other color toner images and the protruding portions of the intermediate transfer body.

Note that it is more preferable that the pitch of moire fringe pattern produced by a toner image in the lowest lightness color and the protruding portions of the intermediate transfer body has a first value, and that of moire fringe pattern produced by a toner image in the highest lightness color and the protruding portions of the intermediate transfer body has a second value greater than the first value, and that of moire fringe pattern produced by a toner image in intermediate lightness color and the protruding portions of the intermediate transfer body has an intermediate value between the first and second values.

These pitches of moire fringe patterns can be controlled by controlling the structure of protruding portions on the surface of the intermediate transfer body and the halftone screen structure.

Further, as shown in FIG. 12, it can be understood that in use of any color toner, if the pitch of moire fringe pattern is shorter than about 0.5 mm, the visibility abruptly becomes lower, and the degradation of image quality is reduced. That is, the degradation of image quality can be suppressed by controlling the structure of the protruding portions on the surface of the intermediate transfer body and the halftone screen structure such that the pitch is equal to or shorter than 0.5 mm (50 or more lines per inch).

In the above embodiment, round dot shaped protruding portions are employed in the structure of the protruding portions on the surface of the intermediate transfer body, however, as well known, a moire fringe pattern appears between arrangements both having an approximately uniform distribution, accordingly, the shape of the protruding portion is not limited to the round dot shape, but rectangular shape and liner shape may be applied to the present invention. Further, in the above embodiment, a belt-type intermediate transfer body is employed, however, a drum-type intermediate transfer body may be employed.

As described above, according to the present invention, in an image forming apparatus which represents gradation of an image by using a halftone screen structure having a dot structure or line structure, and which transfers and fixes the image onto a print medium by using an intermediate transfer body where a number of protruding portions are provided with an approximately uniform distribution, the degradation of image quality, due to a moire fringe pattern produced by the halftone screen structure and the arrangement of the large number of protruding portions, can be reduced.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus comprising:
   a plurality of toner image formation units that form toner images with toner in different colors on an image holder, by using a halftone representation screen to represent gradation of an image by the area size of a dot or line; and
   an intermediate transfer fixing unit that transfers the toner images on said image holder onto an intermediate transfer body, then holds the transferred toner images between the intermediate transfer body and a print medium, and transfers and fixes the transferred toner images onto the print medium by at least heating,
   wherein the surface of said intermediate transfer body has a number of protruding portions arranged with an approximately uniform distribution, and wherein at least one of the distribution of the protruding portions or the structure of said halftone representation screen is controlled such that, regarding moire fringe patterns generated by the protruding portions and the toner images in the respective colors formed by using said halftone representation screen, a pitch of a moire fringe pattern produced by the protruding portions and a toner image in a color of the lowest lightness is not longer than pitches of moire fringe patterns produced by the protruding portions and toner images in other colors.

2. An image forming apparatus comprising:

a plurality of toner image formation units that form toner images with toner in different colors on an image holder, by using a halftone representation screen to represent gradation of an image by the area size of a dot or line; and an intermediate transfer fixing unit that transfers the toner images on said image holder onto an intermediate transfer body, then holds the transferred toner images between the intermediate transfer body and a print medium, and transfers and fixes the transferred toner images onto the print medium by at least heating, wherein the surface of said intermediate transfer body has a number of protruding portions arranged with an approximately uniform distribution, and wherein at least one of the distribution of the protruding portions or the structure of said halftone representation screen is controlled such that, regarding moire fringe patterns produced by the protruding portions and the toner images of the respective colors, formed by using said halftone representation screen, a pitch of a moire fringe pattern produced by the protruding portions and a toner image in a color of the highest lightness is longer than pitches of moire fringe patterns produced by the protruding portions and toner images in other colors.

3. An image forming apparatus comprising:

a plurality of toner image formation units that form toner images on an image holder, by using a halftone representation screen to represent gradation of an image by the area size of a dot or line; and an intermediate transfer fixing unit that transfers the toner images on said image holder onto an intermediate transfer body, then holds the transferred toner images between the intermediate transfer body and a print medium, and transfers and fixes the transferred toner images onto the print medium by at least heating, wherein the surface of said intermediate transfer body has a number of protruding portions arranged with an approximately uniform distribution, and wherein at least one of the distribution of the protruding portions or the structure of said halftone representation screen is controlled such that a pitch of a moire fringe pattern produced by the protruding portions and the toner images formed by using said halftone representation screen is equal to or shorter than 0.5 mm.

4. The image forming apparatus according to claim 1, wherein the structure of said halftone representation screen is controlled by controlling the number of halftone screen lines.

5. The image forming apparatus according to claim 1, wherein the structure of said halftone representation screen is controlled by controlling an angle of said halftone representation screen.

6. The image forming apparatus according to claim 1, wherein the distribution of said protruding portions is controlled by controlling an interval between said protruding portions.

7. The image forming apparatus according to claim 2, wherein the structure of said halftone representation screen is controlled by controlling the number of halftone screen lines.

8. The image forming apparatus according to claim 2, wherein the structure of said halftone representation screen is controlled by controlling an angle of said halftone representation screen.

9. The image forming apparatus according to claim 2, wherein the distribution of said protruding portions is controlled by controlling an interval between said protruding portions.

10. The image forming apparatus according to claim 3, wherein the structure of said halftone representation screen is controlled by controlling the number of halftone screen lines.

11. The image forming apparatus according to claim 3, wherein the structure of said halftone representation screen is controlled by controlling an angle of said halftone representation screen.

12. The image forming apparatus according to claim 3, wherein the distribution of said protruding portions is controlled by controlling an interval between said protruding portions.

13. An image forming method of forming toner images on an image holder by using a halftone representation screen to represent gradation of an image by the area size of a dot or line, and transferring the toner images onto a surface of an intermediate transfer body, having a number of protruding portions arranged with an approximately uniform distribution on the surface, and transferring the toner images transferred onto said intermediate transfer body onto a print medium and fixing the toner images by at least heating, wherein at least one of the distribution of said protruding portions of said surface of the intermediate transfer body or the structure of said halftone representation screen is controlled so as to reduce moire fringe patterns generated by said protruding portions of said surface of the intermediate transfer body and the toner images formed by using said halftone representation screen.

14. The image forming method according to claim 13, wherein the structure of said halftone representation screen is controlled by controlling the number of halftone screen lines.

15. The image forming method according to claim 13, wherein the structure of said halftone representation screen is controlled by controlling an angle of said halftone representation screen.

16. The image forming method according to claim 13, wherein the distribution of said protruding portions is controlled by controlling an interval between said protruding portions.

* * * * *